United States Patent [19]

Parker

[11] 4,299,441
[45] Nov. 10, 1981

[54] TRANSPARENT LABORATORY SLIDE FOR EXAMINATION OF LIQUID SPECIMENS

[75] Inventor: James E. Parker, Long Beach, Calif.

[73] Assignee: ICL/Scientific, Fountain Valley, Calif.

[21] Appl. No.: 41,753

[22] Filed: May 23, 1979

[51] Int. Cl.³ .......................... G02B 21/34; B29F 1/00
[52] U.S. Cl. ...................................... 350/95; 264/1.1; 264/328.12; 356/244
[58] Field of Search ..................... 350/95, 92; 356/244, 356/246; 422/102, 104

[56] References Cited

U.S. PATENT DOCUMENTS

| | | | |
|---|---|---|---|
| 1,654,369 | 12/1927 | George | 350/94 |
| 3,432,275 | 3/1969 | Unger | 350/95 |
| 3,777,283 | 12/1973 | Elkins | 350/95 |
| 3,961,346 | 6/1976 | White | 350/95 |

Primary Examiner—Jon W. Henry
Attorney, Agent, or Firm—Fulwider, Patton, Rieber, Lee & Utecht

[57] ABSTRACT

An improved transparent slide, and method of manufacture, the slide having a plurality of covered chambers defined between generally parallel and uniformly spaced sidewalls integral to the slide and having a channeled configuration for inducing a liquid specimen into the chambers, wherein the size of the chamber and the thickness of the side walls is significantly reduced from prior structures. An improved molding method adapted for producing the thinner slide sidewalls, the method including the use of a plurality of injection ports for delivering molten plastic to a mold and locating of a plurality of symmetrical dams in the mold that act to uniformly distribute and improve the flow of molten plastic near chamber forming portions of the mold. In accordance with one embodiment of the present invention, the upper surface of the slide has a frosted surface portion suitable for writing upon and has a plurality of small protrusions from the surface for ensuring adequate spacing from adjacent slides, when multiple slides are packaged together.

18 Claims, 9 Drawing Figures

U.S. Patent    Nov. 10, 1981    4,299,441
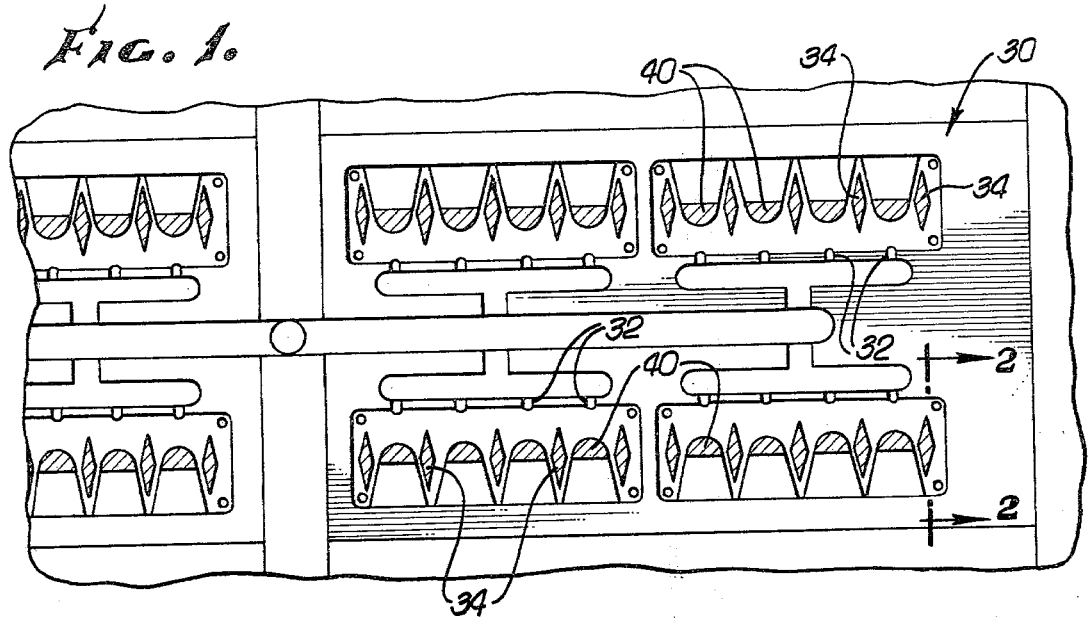
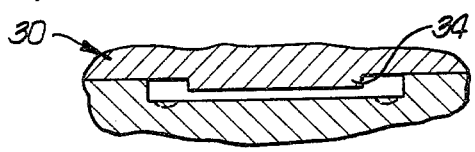
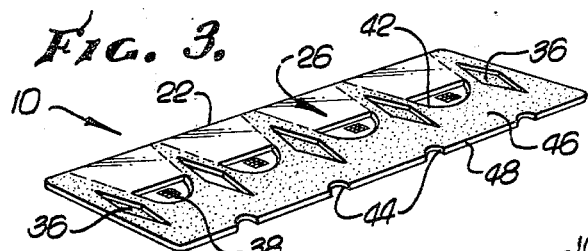
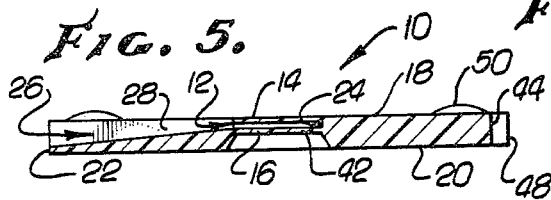
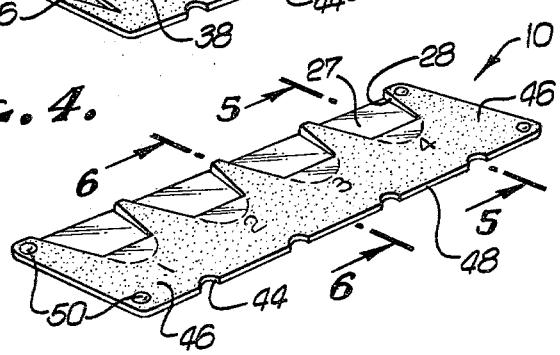
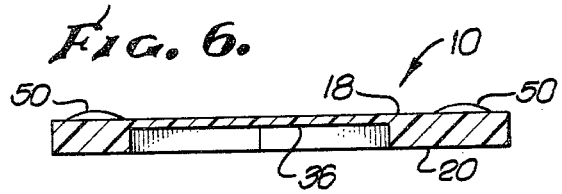
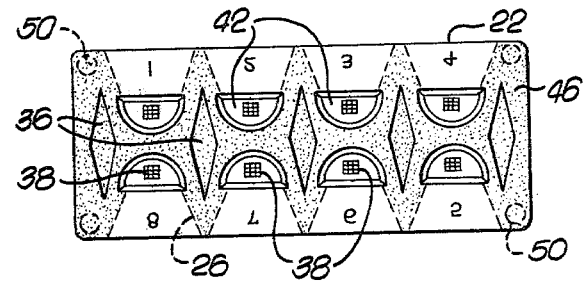
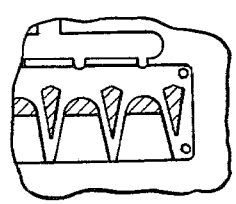
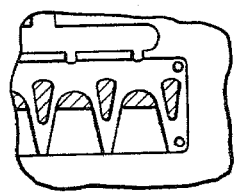

TRANSPARENT LABORATORY SLIDE FOR EXAMINATION OF LIQUID SPECIMENS

BACKGROUND OF THE INVENTION

This invention relates to equipment used in optical systems for examining liquid specimens, and relates more particularly to an improved transparent laboratory slide having at least one chamber for holding the specimen as it is subjected to optical examination.

Transparent laboratory slides for containing a liquid specimen to be examined, such as a body fluid, are disclosed in U.S. Pat. No. 3,777,283 issued to Elkins (commonly assigned). The structure of the Elkins slide permits capillary action to charge a liquid specimen introduced onto the slide into an examination chamber. Moreover, such capillary action acts to retain the specimen in the chamber. The specimen can then be visually inspected and the occurrence of certain suspended materials in a given unit volume can be quantitatively and qualitatively evaluated. The results of these evaluations may then be extrapolated to determine the given characteristics of the entire sample extracted from a patient and thereby provide a valuable diagnostic tool in detection of a variety of diseases.

It is desirable, if not necessary, to have the chamber wall of the slide as thin as possible to achieve rapid focusing under microscope examination and to have the chamber as small as possible but still contain a representative portion of the sample so that the laboratory technician need only examine a small quantity of the sample for a specific evaluation and preserve the remainder for additional testing.

Fabrication of slides having a small, yet accurately configured chambers and chamber sidewalls in machines capable of mass production presents certain difficulties. As the chamber size is reduced, slight manufacturing inaccuracies become increasingly significant, in percentage terms, as such inaccuracies may adversely affect the desired chamber volume and desired quantity of specimen contained therein. Moreover, as molded parts of the slide decrease in size, the molten plastic is increasingly likely to chill and harden prematurely in the mold, before the molding process is fully completed. Additionally, disruptions in precise molding may also be caused by trapped gases within the mold and thereby pose problems regarding accurate construction of the slide within given design tolerances.

Certain parameters must be met for selection of suitable materials from which the slide is composed. For instance, should the material react chemically with or have significant affinity for agents present in the contained specimen, the accuracy and reproducibility of the evaluation may be deleteriously affected. Certain materials from which slide can be fabricated may cause packaged multiple slides to adhere to one another which may cause scratching or marring of the slide surface and resultant difficulties in performing accurate microscopic examination of the specimen. Additionally, such affinity of slides for one another makes separation of packaged multiple slides difficult and time consuming.

Hence, those concerned with structural characteristics and fabrication of transparent slides for examination of liquid specimens have recognized a significant need for an improved slide having a smaller examination chamber fabricated by a process which insures the accuracy of its manufacture within given parameters and which overcomes the foregoing difficulties. The present invention fulfills this need.

SUMMARY OF THE INVENTION

The present invention resides in an improved transparent slide for containing at least one liquid specimen, and preferably a plurality of specimens, for wet mount examination, the slide having relatively thin chamber side walls making optical inspection of the specimen easier. Further, the slide possesses a tapering specimen charging channel which more quickly and surely charges the specimen into the chamber. Moreover, a reduced chamber volume from previous structures allows more rapid specimen sampling and improved molding techniques enhance the accuracy and reproducibility of the sample examination.

These improved molding techniques include the use of a plurality of injection ports for charging molten plastic into the mold, locating semi-circular indentations in the longitudinal edge of the slide about the injection port and the use of symmetrical dams adapted to improve the flow of molten plastic into constricted portions of the mold. In one embodied form, the dams are diamond shaped and configured between slide chambers in the bottom surface of the slide.

In yet another embodiment, the upper surface of the slide may include a frosted portion adapted to be written upon by laboratory technicians. Further, the upper surface of the slide may include a plurality of small protrusions which space the slide from adjacent slides when packaged together to thereby prevent sticking without the use of paper or other spacing material.

The improved transparent slide of the present invention is preferably fabricated of cellulose propionate or other similar materials which are free from adverse acid affinity characteristics.

Other aspects and advantages of the present invention will be apparent from the following more detailed description, taken in conjunction with the accompanying drawings.

BRIEF DESCRIPTION OF THE DRAWINGS

FIG. 1 is an enlarged plan view of a charged mold half suitable for fabricating the transparent laboratory slide embodying the novel features of the present invention;

FIG. 2 is a further enlarged cross-sectional view taken substantially along line 2—2 of FIG. 1;

FIG. 3 is a perspective view of the bottom face of one embodied slide having a plurality of examination chambers in accordance with the present invention;

FIG. 4 is a perspective view of the top face of one embodied slide having a plurality of examination chambers in accordance with the present invention;

FIG. 5 is an enlarged cross-sectional view taken substantially along line 5—5 of FIG. 4;

FIG. 6 is an enlarged cross-sectional view taken substantially along line 6—6 of FIG. 4;

FIG. 7 is an enlarged plan view of the bottom face of another embodied slide having a plurality of examination chambers in accordance with the present invention;

FIG. 8 is an enlarged fragmentary view of a charged mold half illustrating an alternate design for symmetrical dams suitable for fabricating the transparent laboratory slide embodying the novel features of the present invention; and FIG. 9 is an enlarged fragmentary view of a charged mold half illustrating another alternate design for symmetrical dams suitable for fabricating the transparent laboratory slide embodying the novel features of the present invention.

DETAILED DESCRIPTION OF THE PREFERRED EMBODIMENT

Shown in the drawings FIGS. 3 through 7 for purposes of illustration is an improved slide 10 which is formed as an elongated rectangular plate of thin and relatively stiff transparent material, and has a plurality of chambers 12 spaced apart of the plate in a central portion thereof to receive and hold at least one liquid specimen to be examined. In typical use, a small quantity of the liquid, for instance from about 0.004 ml to 0.006 ml, is placed in a chamber, for instance via transfer pipette and the slide is placed under a microscope for a visual inspection, such as the analysis of sediment contained in urine or other body fluid such as spinal fluid, sputum, blood or the like.

Referring to FIG. 5, each chamber 12 is formed as a thin, flat pocket in the slide plate 10 that is defined between spaced upper and lower chamber walls 14 and 16 that are generally parallel to each other and parallel to upper and lower surfaces 18 and 20 of the slide plate 10. One side of each chamber 12 is open, and faces laterally toward a front longitudinal edge 22 of the plate 10. The remainder of the chamber 12 is closed by an edge wall 24 extending around the chamber from one end of the open side to the other.

Because the spacing between the chamber walls 14 and 16 is substantially uniform in all areas of the chamber 12, typically from about 0.004 inches to 0.008 inches the thickness of the layer of liquid filling the chamber is substantially uniform. Thus, a microscopic count of particles in a given area of the chamber 12 will provide an accurate and reliable indication of the quantitative composition of the entire sample.

As most clearly seen in FIG. 5, to facilitate the insertion of liquid into the chambers 12, channels 26 are formed in the upper surface 18 of the plate 10 extending from the open sides of the chambers laterally toward the front edge 22 of the plate 10. The channels 26 are of rectangular cross section, the bottom of each channel sloping upward toward the upper plate surface 18 as the channel extends from the longitudinal edge 22 toward the chamber 12. Side edges 28 of the channel 26 similarly extend from the edge to the open side of the chamber 12 converging toward each other in the direction toward the chamber 12. Thus, the channel 26 decreases in cross-sectional area in the direction from the edge 22 toward the chamber 12 thereby increasing the capillary action in the direction of the chamber and assisting in the introduction of the liquid specimen into the chamber.

As shown in FIGS. 1 and 2, the slide 10 is produced in mass production by injecting molten plastic into a mechanical mold 30 configured to receive the flow of molten plastic and produce a plurality of slides simultaneously therefrom. After the injection of the plastic into the mold 30 ceases and the plastic forming the slide has solidified, typically taking place within a fraction of a second, the multi-slide assembly is ejected from the mold 30 and the slides 10 can be removed from the casting material. The molding 30 will typically operate at a pressure of about 900 psi to about 1300 psi.

In accordance with the present invention the size of the chamber 12 of slide 10 is significantly reduced, from previously known structures, for example about a thirty-three percent decrease in volume relative to the aforementioned Elkins structure, and improved injection molding technique allow the molten plastic to more accurately conform to the mold shape and to produce the improved slide within given design tolerances. By injecting the molten plastic into the mold 30 through a plurality of injection ports 32 and by configuring in the mold 30 a plurality of dams 34 which form symmetrical recesses 36 in the lower surface 20 and/or upper surface 18 of the slide 10, the molten plastic is caused to more accurately conform to the contours of the mold 30 thereby permitting the molding of a chamber 12 having a volume which is relatively reduced and at the same time more accurately formed.

In one embodied form, as seen in FIG. 4 an improved upper surface 18 of the slide 10 includes a frosted surface 46, which is adapted to be written upon, and a plurality of small protrusions 50 which are of sufficient height to provide separation between adjacently packed slides.

Accordingly, in the improved slide of the invention, quicker and simpler microscope focusing can be achieved by a reduction of the thickness of the chamber walls 14 and 16 above and below the liquid sample to be examined. The reduced wall thickness is achieved by locating the chamber 12 more closely adjacent to the upper surface 18 of the slide 10 thereby reducing the thickness of the upper chamber wall, and by locating a recess 36 in the lower surface 20 adjacent the chamber 12 and thereby reducing the thickness of the lower chamber wall 16. The preferred cross sectional thickness for the chamber walls 14 and 16 for example 0.013 inches ±0.002 inches, shortens the vertical distance through which the inspecting microscope might be focused and, in effect, eliminates a substantial number of potential microscope focusing planes. As illustrated in FIG. 7, gridlike markings 38 can be cast into one of the chamber walls of the slide 10 for the purpose of aiding the laboratory personnel to ascertain the limits of a portion of the liquid sample which is to be examined and analyzed. In order to mold the transparent chambers 40 into the slide 10, a plurality of cores (not shown) each having a semi-circular face is included in the mold 30. The core produces a chamfered edged recess 42 having an upper surface parallel to the upper chamber wall 14 in a portion in the lower plate surface 20 immediately beneath the chamber 12.

In order to effect the reduction in the thickness of the chamber walls 14 and 16, the configuration of the mold 30 must be designed to uniformly distribute the flow of molten plastic inside the mold. An insufficient flow of molten plastic into all portions of the mold 30 causing improper and inaccurate casting and causing the trapping of gas or air in the mold was substantially minimized by reconfiguring the mold 30 in accordance with the present invention. One such method of reconfiguring the mold 30 is to include in it a plurality of flow dams 34. The dams 34, herein symmetrical male shapes in the section of the mold 30 forming the lower surface 20 of the slide 10, act to direct the flow of molten plastic into constricted portions of the mold where an insufficient plastic flow can occasion premature plastic solidification. In one preferred embodiment as illustrated in FIG. 1 there are five dams 34 spaced apart across the slide 10 and four chambers 40 are equidistantly spaced between the dams 34. In this regard, a representatively shaped dam 34, one having a diamond shape, is shown in FIGS. 1 and 2. However, as illustrated in FIGS. 8 and 9 it will be appreciated by those skilled in the art that other suitable shapes such as triangles, steeples and the like may be used in constructing the symmetrical dams 34. It has been found most advantageous to locate the dams 34 closely adjacent to and between the portions of the slide 10 where the chambers 40 are located.

Again referring to FIG. 1, the mold operation can also be improved by introducing the molten plastic into the mold 30 through a plurality of injection ports 32. In accordance with the present invention a plurality of ports 32 are located along a back longitudinal edge 48 of the slide 10. In one embodiment, these four ports 32 which terminate in small semi-circular shaped "sub gates" 44 extending inwardly toward the center of the slide 10 direct the molten plastic uniformly toward the constricted sections of the mold 10 in which are produced the top and bottom chamber walls 14 and 16.

Other improvements in the slide 10 which simplify and enhance its useability include a frosted top surface 46 which permits writing on the slide and improves removal of the finished slide from the mold 30. Small, generally spherically shaped, protrusions 50 configured into the upper surface 18 of the slide 10 and/or the lower surface 20 of the slide 10 prevent the slides from sticking to one another when they are packed in stacks or other configurations where they are adjacent to one another.

The slide of the present invention maybe composed of cellulose propionate, glass, or other suitable materials which are free from acid affinity which can destroy red blood cells. Cellulose propionate, having satisfactory wettable characteristics is commercially available from the Eastman Chemical Corporation.

A second presently preferred embodiment of the improved slide 10, as shown in FIG. 7, has eight chambers 12. Four of the chambers 12 open facing the front longitudinal edge 22 of the slide 10 and remaining four chambers 12 face rear longitudinal edge 48. Five dams 34 may also be equidistantly spaced across the slide 10 as in the previously discussed preferred embodiment of FIGS. 3 and 4 and the sets of chambers 12 may be spaced between dams as shown.

From the foregoing, it will be apparent that the present invention provides an improved slide having smaller examination chambers and an improved molding method for producing the slide. The improved method includes the use of a plurality of ports for injecting molten plastic into the mold and symmetrical dams, to direct the flow of molten plastic into constricted portions of the slide. Added convenience to the laboratory technician is provided by a frosted writing surface and protrusions which act to keep the slides separated from one another.

It will also be apparent that, preferred embodiments have been shown and described, various modifications can be made without departing from the spirit and scope of the invention.

I claim:

1. In a plate slide of the type for use in the examination of liquid specimens of urine, spinal fluid, sputum, blood, or the like, having an elongated rectangular plate having flat upper and lower surfaces, a front and a rear longitudinal edge, at least one open faced transparent examination chamber disposed along a longitudinal edge of said plate, said chamber opening toward one edge of said plate and being defined by top and bottom chamber walls, which are generally parallel to each other and to said upper and lower surfaces of said plate, and an edge wall extending around the chamber from one open side to the other open side thereof, and at least one channel having a bottom wall and side walls, said channel extending from each of said open sides of said chamber across the plate and opening along one edge of said plate, the improvement comprising:
   means integral with the plate for ensuring adequate spacing from adjacent slides when multiple slides are stacked adjacent to one another; and
   a plate surface having a plurality of symmetrically configured recesses that are recessed through a substantial proportion of the thickness of said slide;
   and wherein the recesses are diamond shaped and lie adjacent the channel side walls.

2. The slide as defined in claim 1 wherein the chamber edge wall is of semicircular configuration.

3. The slide as defined in claim 1 wherein the spacing between said top and bottom chamber walls is from about 0.004 inches to about 0.008 inches, wherein said top and bottom chamber walls have a cross-sectional thickness of from about 0.011 inches to about 0.015 inches and wherein the volume of said chamber is from about 0.004 ml. to about 0.006 ml.

4. The slide as defined in claim 1 wherein each chamber is disposed between two recesses.

5. The slide as defined in claim 1 wherein said channel is of rectangular cross section, said bottom wall of said channel sloping upward toward the upper plate surface as said channel extends from said longitudinal edge of said plate toward said chamber.

6. The slide as defined in claim 1 wherein one of said upper and lower surfaces is frosted to provide a writing surface.

7. The slide as defined in claim 1 composed of a material free from acid affinity characteristics.

8. The slide as defined in claim 7 wherein said material is cellulose propionate.

9. In a plate slide of the type for use in the examination of liquid specimens of urine, spinal fluid, sputum, blood, or the like, having an elongated rectangular plate having flat upper and lower surfaces, a front and rear longitudinal edge, at least one open faced transparent examination chamber disposed along a longitudinal edge of said plate, said chamber opening toward one edge of said plate, and being defined by top and bottom chamber walls, which are generally parallel to each other and to said upper and lower surfaces of said plate, and an edge wall extending around the chamber from one open side to the other open side thereof, and at least one channel having a bottom wall and side walls, said channel extending from each of said open sides of said chamber across the plate and opening along one edge of said plate, the improvement comprising:
   a plate surface having a plurality of symmetrically configured recesses that are recessed through a substantial proportion of the thickness of said slide, said recesses being arranged such that there is a pair of recesses adjacent to each channel and wherein each said channel is between said adjacent pair of recesses.

10. The slide as defined in claim 9 further comprising means integral with the plate for ensuring adequate spacing from adjacent slides when multiple slides are stacked adjacent to one another.

11. The slide as defined in claim 10 wherein said means comprises at least one protrusion extending from said upper plate surface.

12. The slide as defined in claim 10 wherein said means comprises at least one protrusion extending from said lower plate surface.

13. The slide as defined in claim 9 wherein the chamber edge wall is of semicircular configuration.

14. The slide as defined in claim 9 wherein the spacing between said top and bottom chamber walls is from about 0.004 inches to about 0.008 inches, wherein said top and bottom chamber walls have a cross-sectional thickness of from about 0.011 inches to about 0.015 inches and wherein the volume of said chamber is from about 0.004 ml. to about 0.006 ml.

15. The slide as defined in claim 9 wherein said channel is of rectangular cross section, said bottom wall of said channel sloping upward toward the upper plate surface as said channel extends from said longitudinal edge of said plate toward said chamber.

16. The slide as defined in claim 9 wherein one of said upper and lower surfaces is frosted to provide a writing surface.

17. The slide as defined in claim 9 composed of a material free from acid affinity characteristics.

18. The slide as defined in claim 17 wherein said material is cellulose propionate.

* * * * *

UNITED STATES PATENT AND TRADEMARK OFFICE
CERTIFICATE OF CORRECTION

PATENT NO. : 4,299,441
DATED : November 10, 1981
INVENTOR(S) : James E. Parker

It is certified that error appears in the above—identified patent and that said Letters Patent is hereby corrected as shown below:

Column 1, line 35, "chambers" should be -- chamber --

Column 5, line 31 "maybe" should be -- may be --;

line 57, after "that" insert -- while --

Signed and Sealed this

Seventeenth Day of August 1982

[SEAL]

Attest:

GERALD J. MOSSINGHOFF

Attesting Officer     Commissioner of Patents and Trademarks